United States Patent Office 2,866,069
Patented Dec. 23, 1958

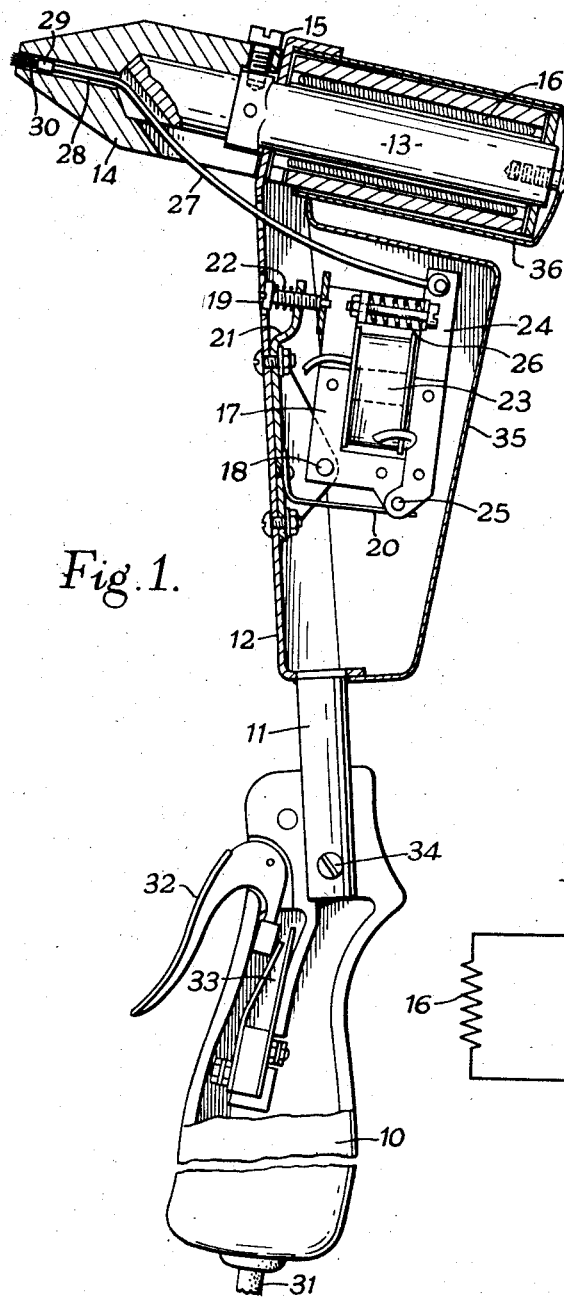
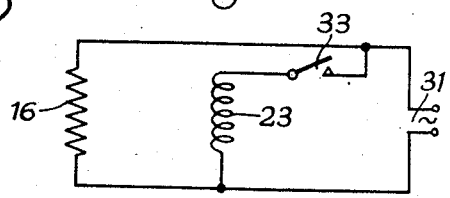

2,866,069

SOLDERING IRONS

Oscar Kriwaczek, London, England, assignor to The Belark Tool & Stamping Company Limited, London, England Application January 8, 1954, Serial No. 402,997

Claims priority, application Great Britain January 21, 1953

15 Claims. (Cl. 219—26)

The present invention relates to soldering irons.

In soldering aluminum with soft solder it is well known that steps have to be taken to ensure that the oxide film on the surface of the aluminum is removed or broken up whilst the surface is covered with molten solder. This is necessary because of the extreme rapidity with which surface oxidisation occurs when aluminum is exposed to air.

In one known method the aluminum to be soldered is pre-heated to a temperature sufficiently high to melt the solder used. A pool of molten solder is then formed on the oxide film on the surface of the aluminum and the film is broken up by the use of a scraper or wire brush operated through the pool of molten solder. Tinning then takes place and after tinning has been effected soldering is carried out in the normal way.

In order to overcome the need for a separate scraping operation it has been proposed to vibrate the entire bit of a soldering iron at ultrasonic frequency. The method of soldering then consists of merely bringing the vibrating bit to bear upon the surface of the preheated aluminum and applying solder in the normal way. The vibrations serve to break up the surface film of oxide and tinning takes place.

The cost of the soldering iron with its associated vibrating mechanism and source of oscillations of ultrasonic frequency is, however, high relatively to that of a conventional soldering iron.

The object of the present invention is to provide a soldering iron by means of which aluminum can be soft soldered without the need for preheating of the workpiece, or for a separate scraping operation, and whose cost can be made substantially less than that of the aforesaid ultrasonic apparatus.

According to the present invention, there is provided an electric soldering iron for operation from a mains supply comprising two mains supply leads connected, or connectable by means of a switch, to the electric heating element of the iron and to an agitating device, the agitating device being adapted, in operation, to cause agitation of an elongated tool arranged in such a manner that when soldering an aluminum workpiece the working end of the tool acts through the molten solder between the bit of the iron and the workpiece, and the material of at least the working end of the tool being of such hardness that the oxide film on the surface of the workpiece can be broken up thereby. The soldering iron is preferably operated from alternating current (A. C.) mains and the agitating device comprises an A. C. vibrator device adapted, in operation, to cause vibration of the said tool. Thus the supply to the vibrator may be of a frequency between, say, 30 and 60 c./s. and the frequency of vibration may be, therefore, between 60 and 120 c./s. The tool may have an operative end in the form of a bundle of steel wires and the arrangement is preferably such that the tool vibrates longitudinally (parallel to the length of the wires). The tool may work in a bore terminating at the tip of the bit, and means are preferably provided whereby the extent to which the tool projects from the end of the bore can be adjusted. The tool may alternatively have a chisel point.

The agitating device and the tool may, of course, take other forms. For example, the agitating device may be arranged to cause rotation of the film-removing tool.

The invention will be described by way of example with reference to the accompanying drawing in which Fig. 1 is a view in part-sectional elevation of one embodiment of the invention and Fig. 2 is a circuit diagram of the embodiment in Fig. 1.

Referring to Fig. 1, the soldering iron shown has a handle 10 of heat-insulating material such as wood or a plastic which is made in two halves bolted together to permit access to its interior. Fixed to the handle 10 is a steel tube 11 carrying a steel support 12. At the end of the support 12 is mounted a soldering bit comprising a central copper rod 13 having a detachable tip portion 14 fixed thereto by a clamping screw 15. The upper part of the rod 13 is surrounded by an electric heating element 16.

On the support 12 is mounted an electro-magnetic vibrator unit 17. This unit 17 is pivoted to the support 12 at 18 and is adjustable about the pivot axis by means of an adjusting screw 19 which acts against a spring 20. The screw 19 is threaded into a bracket 21 and undesired rotation of the screw during vibration of the unit 17 is prevented by a spring 22.

The vibrator unit 17 comprises an E-shaped core having a winding 23 on its centre limb. An armature 24 is pivoted at 25 to the core and its rest position is determined by a spring 26 extending between the armature 24 and the base limb of the core. The free end of the armature 24 has rigidly connected to it one end of a steel rod 27, which passes through apertures in the support 12, tip 14 and rod 13 into a bore 28 passing centrally through the tip 14. At the end of the rod 27 remote from the armature 24 is fixed a cup 29 in which is fixedly mounted a bundle of wires 30, for example of stainless steel.

The heating element 16 is arranged to be connected to a source of A. C. supply through a cable 31 entering the handle 10. The winding 23 of the vibratory unit 17 is arranged to be connected to the A. C. source through the cable 31 only when a trigger 32 is operated. This trigger closes a switch 33. The circuit arrangement is shown in Fig. 2 in which like parts are given the same references as in Fig. 1.

The metal parts of the iron are earthed through a terminal 34 on the rod 11 which is connected to the earth lead of cable 31. The vibrator unit 17 is provided with a detachable cover 35 and the heating element 16 is enclosed by a detachable cover 36.

In use, when the bit has been suitably heated it is held against the surface of the aluminum to be soldered, which may be preheated if necessary, a pool of solder is melted between the tip of the bit and the aluminum and the trigger 32 is operated thus causing the armature 24 to vibrate. Vibrations are transmitted by the rod 27 to the tip 30 and break up the film of oxide on the part of the aluminum from which air is excluded by the pool of solder.

The extent to which the vibratory tip 30 protrudes from the bore 28 can be adjusted by means of the screw 19. Some adjustment of the extent of protrusion may, however, be obtained by varying the pressure exerted on the vibratory tip 30 owing to the fact that the rod 27 is slightly bowed and can thus yield longitudinally.

It will be appreciated that the additional cost of the vibrator unit with its associated tool is small relatively to the cost of the ultrasonic equipment necessary in the aforesaid known ultrasonic apparatus. It has been found, however, that a soldering iron in accordance with the present invention can produce results which are satisfactory for most purposes.

Likewise it will be appreciated that the cost of a small D. C. or A. C. motor adapted to drive a rotary tool although more than that of an A. C. vibrator is nevertheless substantially lower than that of the aforesaid known ultrasonic apparatus.

Instead of the tool 27, 29, 30 operating through a bore in the bit, it may operate in guides alongside of the bit so long as the tip thereof is adapted, in use, to engage the aluminum surface covered by the pool of solder melted by the bit.

I claim:

1. A soldering iron comprising a soldering bit for applying solder to a workpiece, an oxide film-breaking tool, said bit being provided with means for supporting said tool for movement relative to said bit, and means for vibrating said tool relatively to said bit to break up an oxide film.

2. A soldering iron comprising a soldering bit for applying solder to a workpiece, and having a soldering surface to be brought into close relation to the surface to be soldered, an elongated oxide film-breaking tool, said bit being provided with means for supporting said tool for movement relative to said bit, and means for vibrating said tool in the direction of its length relatively to said bit into engagement with said surface to be soldered.

3. A soldering iron comprising a soldering bit for applying solder to a workpiece, said bit having a bore and a soldering surface around said bore, an elongated oxide film-breaking tool slidably mounted in said bore and projectable beyond the outer end of said bore through said surface, and means for vibrating said tool in the direction of its length relative to said bit.

4. A soldering iron suitable for soldering aluminum comprising a soldering bit for applying solder to a workpiece, a bundle of wires, said bit being provided with means for movably supporting said bundle of wires, said wires having thin ends positioned to engage the surface of said aluminum in a region between said bit and said aluminum, and means for agitating said wires relatively to said bit to break up oxide film on said surface.

5. A soldering iron comprising a soldering bit for applying solder to a workpiece, an oxide film-breaking tool slidably mounted in said bit, electromagnetic means for vibrating said tool relatively to said bit, and a trigger-operated switch connected to control the actuation of said electromagnetic means.

6. A soldering iron according to claim 4, wherein said agitating means vibrate said wires in the direction of their length.

7. A soldering iron according to claim 4, comprising means for adjustably displacing said bundle of wires in the direction of the length of the wires, for the purpose of adjusting the extent to which said wires project beyond said bit.

8. A soldering iron comprising a soldering bit for applying solder to a workpiece, electric heating means for said bit, terminals for connection to a source of electric current, electrical connections between said terminals and said heating element, an oxide film-breaking tool, said bit being provided with means for supporting said tool for movement relative to said bit, electromagnetic means for agitating said tool relatively to said bit, electrical connections between said terminals and said electromagnetic means, and a trigger-operated switch in the last-named connections.

9. A soldering iron comprising relatively stationary soldering bit means, a movable oxide film-breaking tool within said bit means and extending therebeyond, means for heating said soldering bit means, and means for rapidly moving said tool to and fro relative to said stationary soldering bit means.

10. A soldering iron comprising a soldering bit and an oxide film-breaking tool, said bit being provided with support means for said tool, said tool being in slidable contact with said support means, and means for agitating said tool relative to said support means.

11. A soldering iron according to claim 10 in which said agitating means vibrates said tool in the direction of its length.

12. A soldering iron according to claim 10 comprising adjustable means for displacing said tool in the direction of its length.

13. A soldering iron suitable for soldering aluminum comprising a soldering bit for applying solder to a workpiece, said bit being provided with means for movably supporting a bundle of wires, said wires having their ends positioned to enclose the surface of said aluminum in a region between said bit and said aluminum, and means for agitating said wires relatively to said bit to break up oxide film on said surface.

14. A soldering iron in accordance with claim 12, wherein said agitating means vibrates said wires in the direction of their length.

15. A soldering iron according to claim 12, comprising means for adjustably displacing said bundle of wires in the direction of the length of the wires, for the purpose of adjusting the extent to which said wires project beyond said bit.

References Cited in the file of this patent

UNITED STATES PATENTS

| 399,387 | Dolan | Mar. 12, 1889 |
| 1,240,901 | Symons | Sept. 25, 1917 |
| 1,819,671 | Buccola | Aug. 18, 1931 |
| 2,397,400 | Barwick | Mar. 26, 1946 |
| 2,523,638 | Tice | Sept. 26, 1950 |
| 2,676,236 | Birkbeck et al. | Apr. 20, 1954 |

FOREIGN PATENTS

| 402,497 | Great Britain | Dec. 7, 1933 |
| 658,922 | Great Britain | Oct. 17, 1951 |
| 814,765 | Germany | Sept. 24, 1951 |
| 820,466 | Germany | Nov. 12, 1951 |

OTHER REFERENCES

Thomas et al.: "Soldering Aluminum Alloys," Electronics, June 1948, pages 90–92, pp. 90–92 relied upon (2 pp. spec., 1 sht. dwg.).